W. G. PERKINS.
COMBINED GAGE AND CUTTER MECHANISM.
APPLICATION FILED OCT. 12, 1909.
966,592.
Patented Aug. 9, 1910.
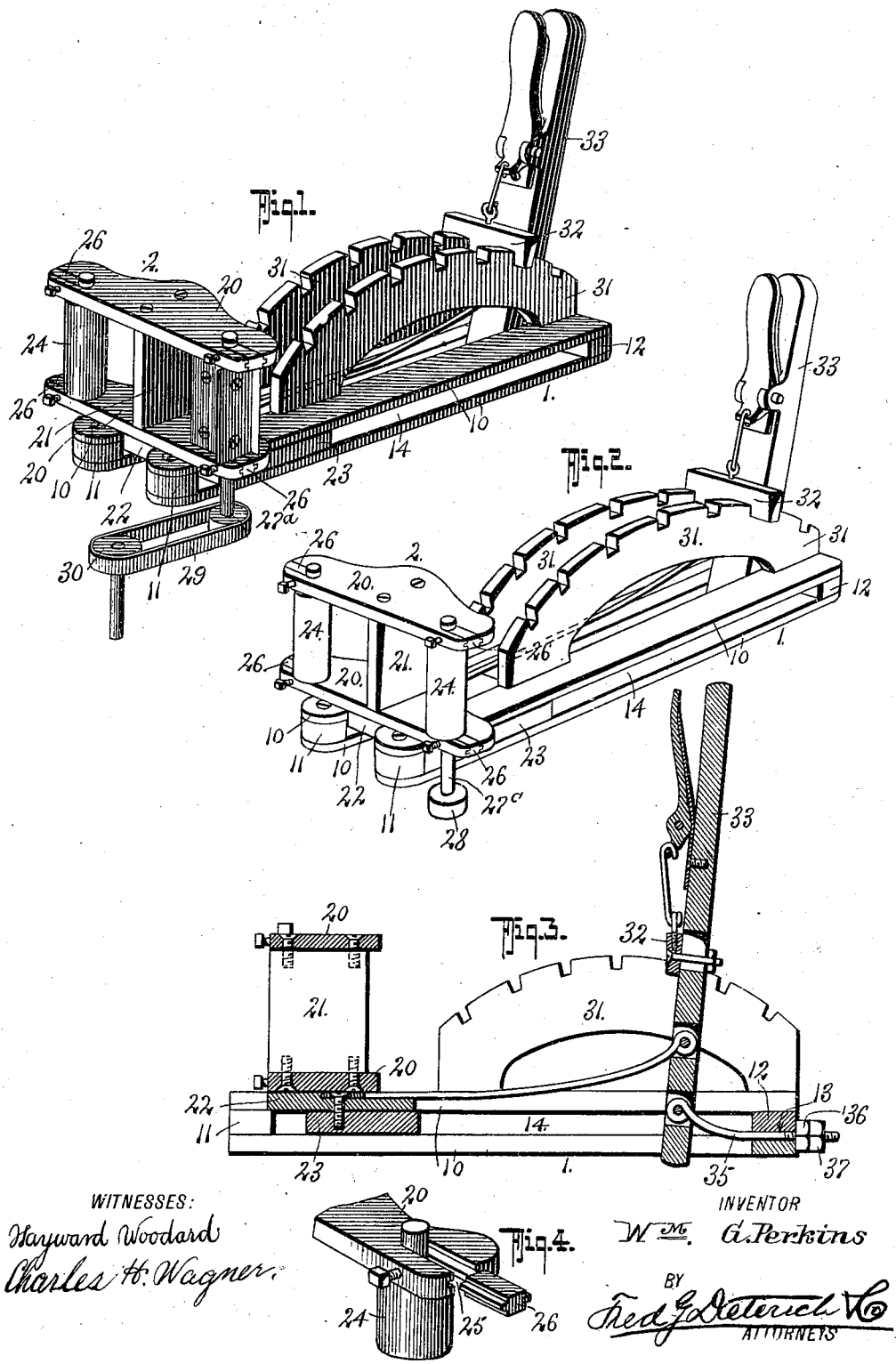
WITNESSES:
Hayward Woodard
Charles H. Wagner
INVENTOR
Wm. G. Perkins
BY
Fred G. Dieterich & Co
ATTORNEYS

UNITED STATES PATENT OFFICE.

WILLIAM G. PERKINS, OF BROOKSVILLE, FLORIDA.

COMBINED GAGE AND CUTTER MECHANISM.

966,592.  Specification of Letters Patent.  Patented Aug. 9, 1910.

Application filed October 12, 1909. Serial No. 522,339.

*To all whom it may concern:*

Be it known that I, WILLIAM G. PERKINS, residing at Brooksville, in the county of Hernando and State of Florida, have invented a new and Improved Combined Gage and Cutter Mechanism, of which the following is a specification.

My invention has for its object to provide a simple, inexpensive and easily manipulated mechanism in the nature of a combined adjustable guide and planer means for saw mill carriages, and it consists in the peculiar arrangement and novel combination of parts hereinafter fully described, specifically set out in the appended claim and illustrated in the accompanying drawing, in which:—

Figure 1, is a perspective view of my invention showing the same arranged as a planer. Fig. 2, is a similar view showing it arranged as a guide or gage. Fig. 3, is a longitudinal section thereof. Fig. 4, is a detail view of one end of the carrying heads with the removable bearing members.

In the practical arrangement of my machine, the base is formed of parallel longitudinally extended members 1—1, each consisting of an upper and a lower bar 10—10, separated at the front ends by space blocks 11 and at the rear ends by a cross bar 12 having a central aperture 13, the purpose of which will presently appear, the said members 10—10, 11 and 12 being suitably bolted together to form a strong base with elongated horizontal slots 14—14.

2 designates a carriage composed of the upper and lower heads 20—20 joined by the vertical standard 21, the lower head having a pendent leg 22 laterally extended to form slides 23—23 for riding in the slots 14—14. The front edges of the heads 20—20 are in vertical alinement and are in a plane at right angles to the longitudinal axis of the bed so as to present a bearing in a plane parallel with the edge of the timber that is held up to the gage as it is fed to or from the saw.

In the construction shown, the opposite ends of the heads have slotways 25—25 to receive removable brasses or bearings 26—26 so that either the journals of guide rollers 24—24 or the journals of a planer or cutter head (see Fig. 1) can be interchangeably mounted in either or both ends of the heads. When used as a planer but one cutter head is preferably used, as shown in Fig. 1, the roller at the other end forming a guide for the lumber being trimmed, and the shaft 27ᵃ of the cutter extends below the base 1 and carries a belt pulley 28 around which takes a drive belt 29 that takes around a drive pulley 30 which, in the practical application of my invention, may be friction or otherwise clutched with a pulley drive from the saw arbor, in the well-known manner.

31—31 designate a pair of segmental racks mounted on the parallel side members of the base with which coacts a pawl 32 slidably mounted on the setting lever 33. To provide for adjusting the sweep movements of the lever so my invention may be readily adapted for getting the proper set and gage for the size of lumber desired to cut, I mount the said lever 33 in the manner best shown in Fig. 3, by reference to which it will be seen the lower end of the lever fulcrums on a rod 35 adjustably mounted on the base frame and whose outer end extends through the aperture 13 in the base and is threaded to receive the adjusting nut 36 and jam nut 37, it being obvious that by proper adjustment of the said nuts the head stock can be first set to accommodate the general different sizes of timber and after set, can be adjusted to suit the exact sizes to be planed or held for the trimmer saws.

From the foregoing, taken in connection with the drawing, the complete arrangement, the manner of operation and the advantages of my invention, are apparent and need not be further specified.

Having thus described my invention, what I claim is:

A mechanism of the character stated that comprises a base formed of two sets of parallel bars and spacing blocks between the bars of a set to separate the same, said pairs of bars being spaced one pair from the other to leave a central passageway, a cross plate projected through said pairs of bars and slidable therein, a guide and cutter carriage mounted on the top of said pairs of bars and connected with said slidable plate, a lever whose lower end is projected into the central passage between said pair of bars, a shiftable fulcrum for said lever, a connection between said lever and said guide and cutter carriage shifting plate, and rack segments carried by each pair of bars, and pawl devices carried by said lever for engaging said rack segments.

W. G. PERKINS.

Witnesses:
F. E. Saxon, Jr.,
L. A. Bryant.